US006912984B2

United States Patent
Narasimhan et al.

(10) Patent No.: US 6,912,984 B2
(45) Date of Patent: Jul. 5, 2005

(54) COMPOSITE LIGHTWEIGHT ENGINE POPPET VALVE

(75) Inventors: Sundaram L. Narasimhan, Marshall, MI (US); Sinharoy Shubhayu, Kalamazoo, MI (US); Michael L. Killian, Troy, MI (US); Majo Cecur, Turin (IT); Jose F. Masello, Battle Creek, MI (US); Timothy L. Sheren, Grand Ledge, MI (US)

(73) Assignee: Eaton Corporation, Cleveland, OH (US)

( * ) Notice: Subject to any disclaimer, the term of this patent is extended or adjusted under 35 U.S.C. 154(b) by 151 days.

(21) Appl. No.: 10/401,418

(22) Filed: Mar. 28, 2003

(65) Prior Publication Data

US 2004/0261746 A1 Dec. 30, 2004

(51) Int. Cl.⁷ .................................................. F02N 3/00
(52) U.S. Cl. ............................... 123/188.3; 29/888.45; 251/368
(58) Field of Search .................... 123/188.3; 29/888.45, 29/888.451, 888.452, 888.453; 251/368; 137/375

(56) References Cited

U.S. PATENT DOCUMENTS

| 4,597,367 A | 7/1986 | Hayashi ................. 123/188 AA |
| 4,631,169 A | 12/1986 | Isobe et al. .................. 420/443 |
| 4,834,036 A | 5/1989 | Nishiyama et al. ...... 123/188 A |
| 5,040,501 A | * 8/1991 | Lemelson ................ 123/188.3 |
| 5,370,092 A | 12/1994 | Shimizu et al. .......... 123/188.3 |
| 5,413,073 A | 5/1995 | Larson et al. ............. 123/188.3 |
| 5,441,235 A | 8/1995 | Narasimhan et al. ....... 251/368 |
| 5,458,314 A | 10/1995 | Bonesteel ................... 251/337 |
| 5,517,956 A | 5/1996 | Jette et al. ............... 123/188.3 |
| 5,553,369 A | 9/1996 | Shimizu et al. .......... 29/888.46 |
| 5,823,158 A | 10/1998 | Heimann, Jr. et al. ... 123/188.3 |
| 6,006,713 A | 12/1999 | Gebauer ................... 123/188.3 |
| 6,263,849 B1 | 7/2001 | Bonesteel et al. ........ 123/90.51 |
| 2002/0005233 A1 * | 1/2002 | Shirra et al. ................. 148/428 |

FOREIGN PATENT DOCUMENTS

| DE | 100 31 927 A 1 | 1/2002 | ............. F01L/3/20 |
| JP | 61082519 | 4/1986 | ............. F01L/3/20 |

* cited by examiner

Primary Examiner—Mahmoud Gimie
Assistant Examiner—Katrina B. Harris
(74) Attorney, Agent, or Firm—Daniel S. Kalka

(57) ABSTRACT

A composite lightweight engine poppet valve (10, 110, 210) that has a valve head portion (12, 112, 212) and at least a portion of the stem portion (14, 114, 214) made from a titanium intermetallic material attached by way of a solid state attachment to a nickel base alloy transition piece (16, 116, 216) that is heat treated for high creep resistance. The tip portion (18, 118, 218) made from conventional material is first attached to one end of the transition piece. The transition piece (16, 116, 216) is cut to a desired length and then attached preferably by friction welding to the titanium intermetallic stem portion (14, 114, 214) at a preselected distance (d1, d2, or d3). The tip portion (18, 118, 218) made from conventional material is then attached to the other end of the transition piece. In another embodiment, a second hollow stem portion (215) is attached to the transition piece (216) and the tip portion (218) is then attached thereto.

18 Claims, 3 Drawing Sheets

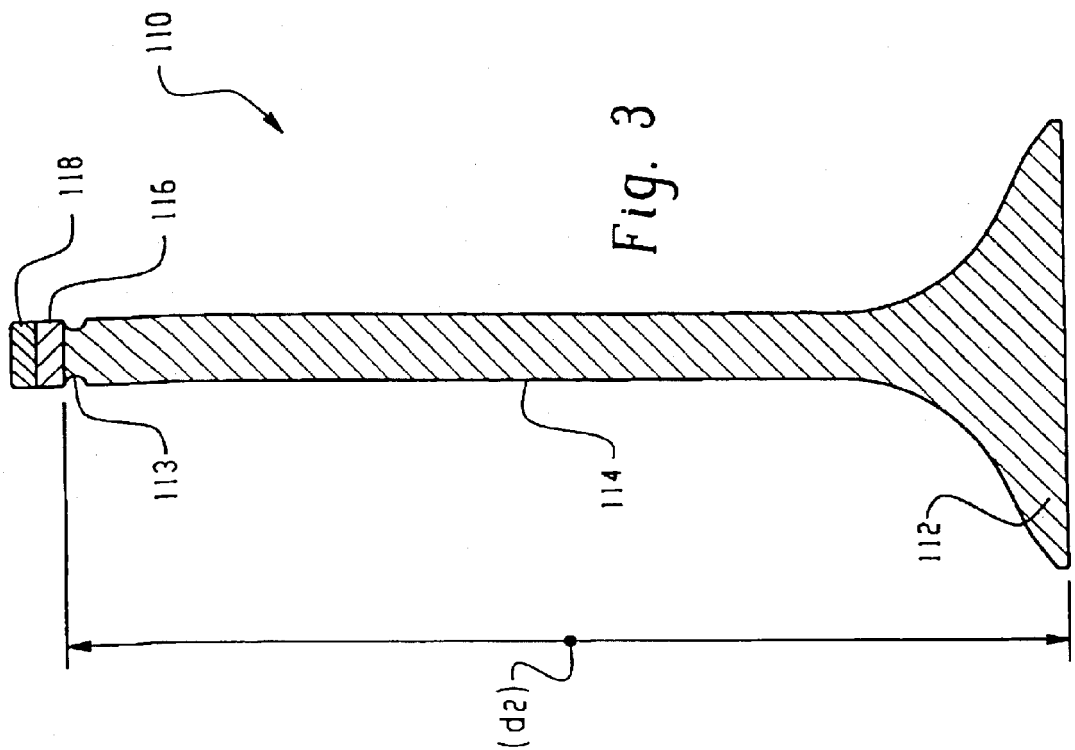
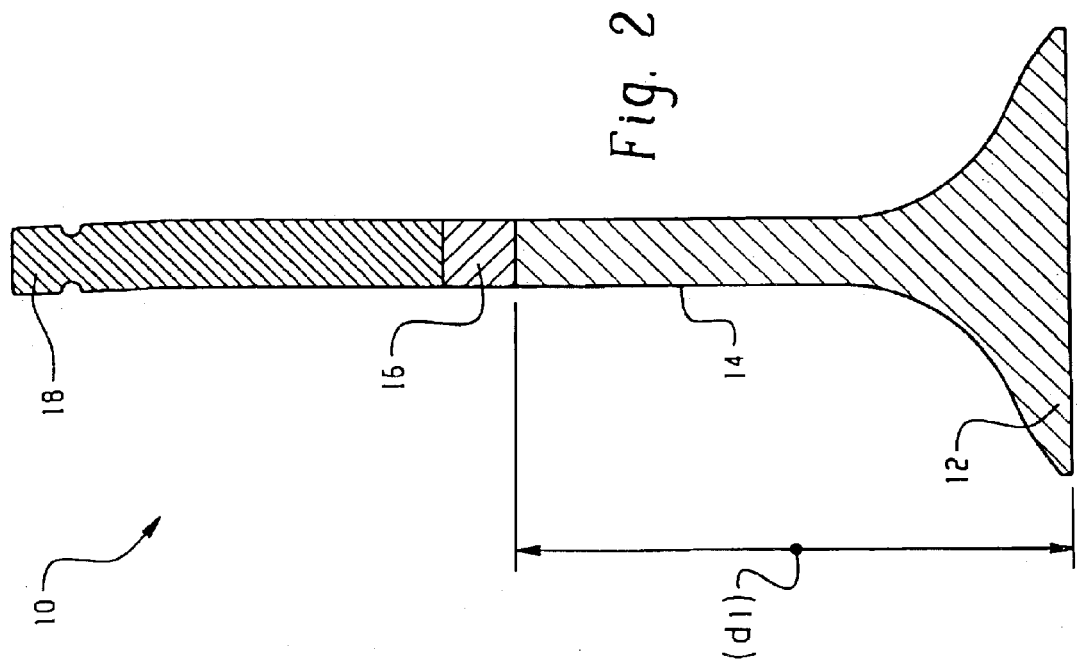

COMPOSITE LIGHTWEIGHT ENGINE POPPET VALVE

BACKGROUND OF THE INVENTION

1. Field of the Invention

The present invention relates generally to a poppet valve for an internal combustion engine, and more particularly to a composite lightweight engine poppet valve having a valve head and at least a part of the stem constructed of a titanium intermetallic material with other parts of the poppet valve manufactured from a different material or materials capable of operating at high temperatures and in a corrosive environment.

2. Description of the Related Art

It is well known in the industry that engine poppet valves operate at relatively high temperatures and in corrosive environments. It is further known that exhaust valves operate under more severe conditions than intake valves. The exhaust valves used in diesel and leaded fuel applications are typically considered heavy duty applications and operate in more severe conditions than do valves in other types of internal combustion engines. Engine poppet valves must be able to withstand even the most severe of these conditions, be functional and have a long life.

Efforts are constantly being made to improve the construction, design, and manufacturing techniques of engine poppet valves. These efforts include, but are not limited to, making the valve lighter in weight, more economical to manufacture, and more durable. Lighter poppet valves reduce valve train friction, and reduce noise vibration. Lightweight poppet valves can be manufactured more cost effectively due to less material employed in the valve. In addition, engine poppet valves can be designed with specific chemical and mechanical properties in mind to withstand the harsh temperature and environmental conditions to which engine poppet valves are subjected. Some of these desired chemical and mechanical properties include, but are not limited to, excellent sulfidation resistance, good hot hardness, sufficient oxidation resistance, optimum thermal resistance, and low thermal expansion.

The term "lightweight" as employed herein is intended to refer to the physical characteristics of the engine poppet valve and its components that mare the engine poppet valve light in weight. The term "lightweight" is also meant to include but not be limited to an ultralight engine poppet valve as that term is defined in U.S. Pat. No. 5,413,073 which is owned by the assignee of the present invention and is hereby incorporated by reference. The assignee of the present invention also owns U.S. Pat. Nos. 5,453,314 and 6,263,849, which are both hereby incorporated by reference. Suppliers of automotive engine poppet valves are continually searching for better materials to make better poppet valves. Intermetallic materials, like titanium aluminide (TiAl), offer the superb qualities of being light weight and heat resistant. Casting TiAl in long, thin shapes, like engine poppet valve stems, is difficult. The TiAl castings often must be hot isostatically pressed (HIP) to reduce porosity. Obtaining high quality, low porosity TiAl cast engine valves is expensive and time consuming. Moreover, despite the superb qualities of TiAl, this material is very brittle, crack sensitive, and lacks wear resistance when in contact with carburized steels, nitrided steels, or high carbon powder metals, i.e., the conventional materials used in valve assemblies. TiAl and other intermetallics are difficult to weld materials due to their brittleness. The intermetallics generally offer less than two percent elongation, whereas conventional materials like steel are characterized by about fifteen to about thirty percent elongation at room temperature and at atmospheric pressure.

While it is possible to fusion weld intermetallics, the welding technique usually includes very high temperature preheats, about 1000 degrees C., and very high temperature postheats. In addition, fusion welds in intermetallics typically are permitted to cool, in a controlled manner, in the fixture after the postheating period. Following postheating, welds in intermetallics receive a post weld stress relief and/or a post weld heat treatment. In the fabrication of engine poppet valves, this approach lacks economic viability and is not practical for high volume manufacturing.

Thus, there is still a need to make improvements in the manufacturing technique and design of a composite lightweight engine poppet valve. The improved engine poppet valve according to the present invention is constructed in an arrangement that allows the valve head and at least part of the valve stem of the engine poppet valve to be manufactured from a titanium intermetallic material and to be attached to other selected parts of the engine poppet valve which have been manufactured from other conventional materials.

BRIEF SUMMARY OF THE INVENTION

Accordingly, an object of the present invention is to provide an improved composite lightweight engine poppet valve made from a combination of titanium intermetallic material and a conventional material through the use of a transition piece for joining the titanium intermetallic material to the conventional material.

Another object of the present invention is to provide an engine poppet valve manufactured with a titanium aluminide valve head and at least a portion of the stem portion joined by means of a heat treated nickel base alloy transition piece to a tip portion made of a hardened steel material.

Still another object of the present invention is to provide such a composite lightweight engine poppet valve with a valve head and at least a portion of the valve stem made from titanium aluminide friction welded to a heat treated nickel base alloy transition piece with high creep resistance which is also attached to a hardened steel material to form the tip portion of the valve.

Still another object of the present invention is to provide an improved method for making a composite lightweight engine poppet valve by friction welding the titanium intermetallic valve head and at least a portion of the valve stem to a heat treated nickel base alloy transition piece having high creep resistance and to another type of material or materials for completion of the valve.

These and other objects of the present invention are accomplished with a composite lightweight engine poppet valve comprising a valve head portion, a stem portion, a tip portion and a flared fillet portion of the valve head portion. The flared fillet portion defines a region between the valve head portion and the stem portion. The valve head portion and at least a portion of the stem portion are made of a titanium intermetallic material attached to a heat treated nickel base alloy transition piece with high creep resistance which is joined to another and different material for making the remainder of the stem portion and the tip portion.

The present invention includes a method for making a composite lightweight engine poppet valve comprising the steps of forming a valve head and at least a portion of the stem portion from a titanium intermetallic material with a preselected length of the stem portion; providing a transition piece from a heat treated nickel base alloy with high creep resistance; attaching one end of the transition piece to another different material for forming tip portion; machining the heat treated nickel base alloy transition piece to a selected length; and attaching the titanium intermetallic stem portion of the valve head to the transition piece.

The various features of novelty which characterize the invention are pointed out with particularity in the claims annexed to and forming a part of this specification. For a better understanding of the invention, its operating advantages, and specific objects attained by its uses, reference is made to the accompanying drawings and descriptive matter in which a preferred embodiment of the invention is illustrated.

BRIEF DESCRIPTION OF THE DRAWINGS

FIG. 2 is a sectional view of a composite lightweight engine poppet valve according to a first embodiment of the present invention;

FIG. 3 is a sectional view of another embodiment of the engine poppet valve according to the present invention;

DETAILED DESCRIPTION OF THE INVENTION

The Figures are not intended to limit the present invention thereto, and like numerals designate like or similar features throughout the several views. The structure of an engine poppet valve is well known in the industry. A typical engine poppet valve includes a valve head that has a flared fillet portion that transitions into a valve stem which terminates in a valve tip portion.

Figure 1:
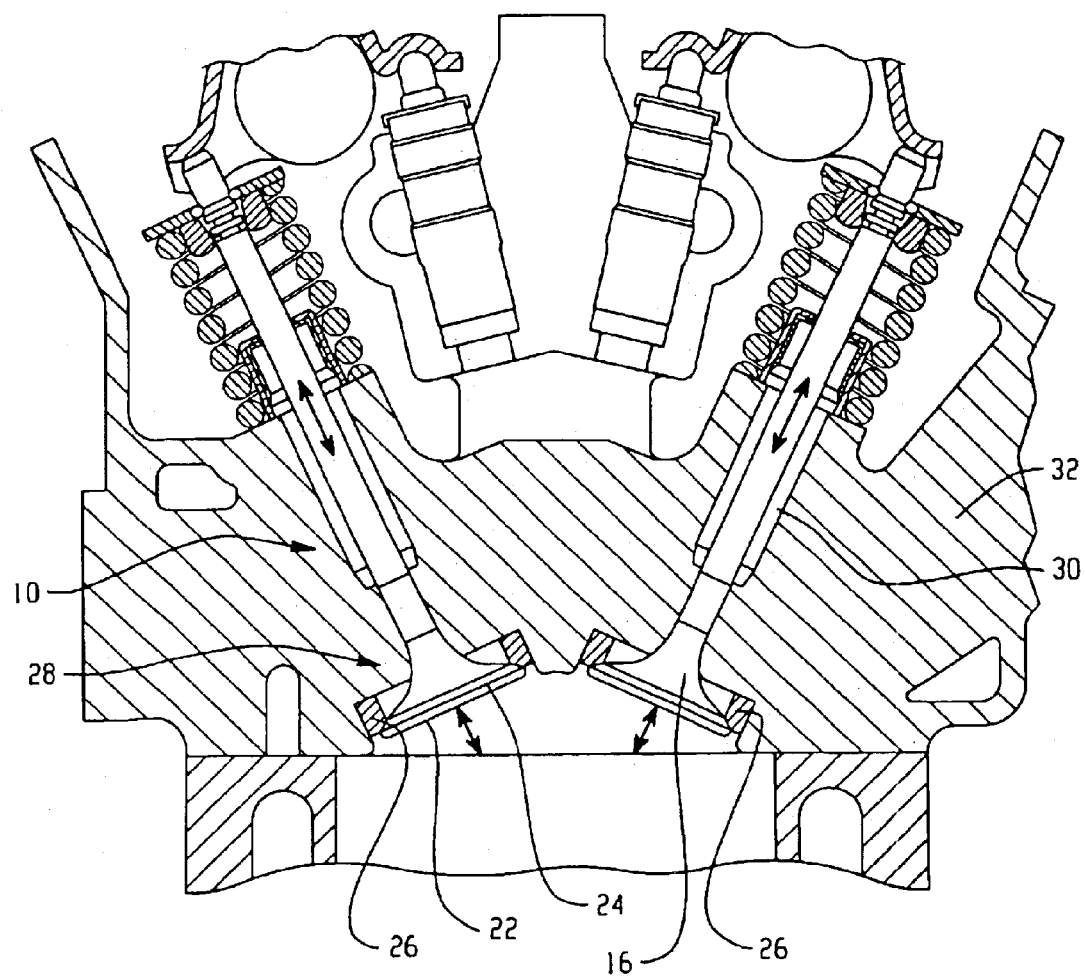
FIG. 1 is a sectional view illustrating a valve assembly and its associated environment.

For the purpose of a general background on the operation of an engine poppet valve in a valve assembly, there is shown in FIG. 1 a composite valve generally designated 10 in a portion of an internal combustion engine. As is well known in the industry, valve head portion 12 includes a combustion face 22 that faces inwardly into an engine combustion chamber and a valve seat face 24 which is the peripheral surface that engages a cylinder head or a valve seat insert 26. The valve head portion 12 is manufactured with a predetermined diameter that depends upon the given internal combustion engine application as is known in the industry. It is further known in this art that an engine poppet valve can be solid, hollow, or partially solid/hollow. The present invention is directed to solid, hollow or partially solid/hollow valves, as will be described in further detail herein, to take advantage of unique material properties involved to achieve an optimum composite light weight valve. The engine poppet valve 10 is reciprocally received within the internal bore of a valve stem guide 30.

While the valve stem guide 30 is depicted as a tubular or cylindrical structure which is inserted into a cylinder head 32 of the engine, it should be understood that alternative embodiments include the cylinder head itself functioning as a guide for the valve stem portion 14 without a separate tubular structure serving as the valve stem guide. The valve seat insert 26 cooperatively receives the valve seat face 24 to provide a sealing engagement. Since the operation of a poppet valve and a valve assembly within an internal combustion engine are well known in this art, further description and details concerning its operation are not included herein for the sake of brevity.

Referring next to FIG. 2, the present invention resides in an improved composite lightweight engine poppet valve generally designated 10. The valve head 12 and at least a portion of the valve stem 14 are made of a light weight heat resistant material, preferably a titanium intermetallic material, and more preferably titanium aluminide (TiAl). The TiAl valve stem 14 is attached to a heat treated nickel based alloy transition piece 16 that has high creep resistance via a solid state attachment. The term "solid state attachment" as used herein is intended to mean that very little of the material of the substrate is melted as opposed to fusion welding which inherently melts the substrate. Friction welding is the preferred method of making a solid state attachment in accordance with the present invention, but brazing and some other welding techniques may be employed as long as very little of the substrate is melted. The transition piece 16 is then further attached to the remainder of the valve stem and/or the tip portion 18 which are made from conventional valve materials known in the art. The attachment of the transition piece 16 to the conventional materials is made with any suitable attachment technique known in this art.

The present invention employs preferably the solid valve head 12 and at least a portion of the stem portion 14 made of a titanium intermetallic material or compound, and preferably, titanium aluminide. As employed herein, the term "titanium intermetallic material" is meant to include but not be limited to the following materials: titanium alloys, titanium aluminide (TiAl), and titanium. The titanium aluminide material is commercially available and comprises titanium with approximately 30 to 50 weight percent aluminum. The aluminum content ranges from about 32% to about 35% with small amounts of iron and oxygen.

The titanium intermetallic material offers high strength-to-weight ratio as well as excellent sulfidation resistance, good hot hardness, sufficient oxidation resistance, high thermal conductivity and low thermal expansion. The term "sulfidation" as used herein is the reaction of the metal or alloy with a sulfur-containing species to produce a sulfur compound that forms on or beneath the surface on the metal or alloy which eventually can lead to failure.

In FIG. 2, valve head 12 is formed preferably by a casting process integrally with at least a part of stem portion 14. Valve head 12 and stem portion 14 may also be formed via a forging process or by powder metallurgy. Valve head 12 and stem portion 14 extend a selected distance (d1). The predetermined distance (d1) is selectable and may be any selected length. A longer stem portion 14 made of TiAl reduces the weight of the valve and reduces side loading of the poppet valve. The term "side loading" as used herein is intended to include but not be limited to the bending of the valve stem that occurs with the valve dynamics as the valve is operating or moving. In the preferred embodiment shown in FIG. 2, the stem portion is of a selected length that places the attachment location of the TiAl valve stem to the transition piece 16 within the valve guide 30 in both the valve's closed and open positions. This length depends upon the given application, but is readily ascertainable to those skilled in this art. Typically, the length of the transition piece 16 ranges from about three to about thirteen millimeters (mm).

For illustrative purposes only and by way of example in the finished condition, an exhaust valve head for a 5.7 liter (L) engine has a diameter of about 39 mm, the length d1 of stem portion 14 is approximately eighty-six (86) mm, the diameter of the stem portion is approximately eight (8) mm and the diameter of the transition piece is about eight (8) mm, the axial length of the transition piece 16 is approximately three to four mm. The intake valve has similar dimensions except the diameter of the valve head is approximately fifty-six (56) mm. The diameter of the stem portion and the transition piece in the unfinished or rough condition is approximately nine (9) mm for the stem portion 14, and approximately ten and half (10.5) mm for the transition piece 16.

FIG. 3 depicts another embodiment of engine poppet valve 110 in accordance with the present invention. The numeral designation "110" is employed simply to distinguish this embodiment from the first embodiment designated "10". The last two digits of the numeral designate like or similar features. This embodiment is quite similar to the first embodiment shown in FIG. 2, except that in this embodiment the length of the stem portion 114 is selected as distance d2 which is a longer length than d1. The longer stem length d2 offers more lightweight, heat resistant material throughout the majority of the stem portion 114 of engine poppet valve 110. As mentioned previously, the longer stem length d2 further reduces the weight of the poppet valve, and reduces side loading. However, the longer length of the stem does require more TiAl material, and is more expensive in terms of material and fabrication costs as mentioned earlier.

Figure 4:
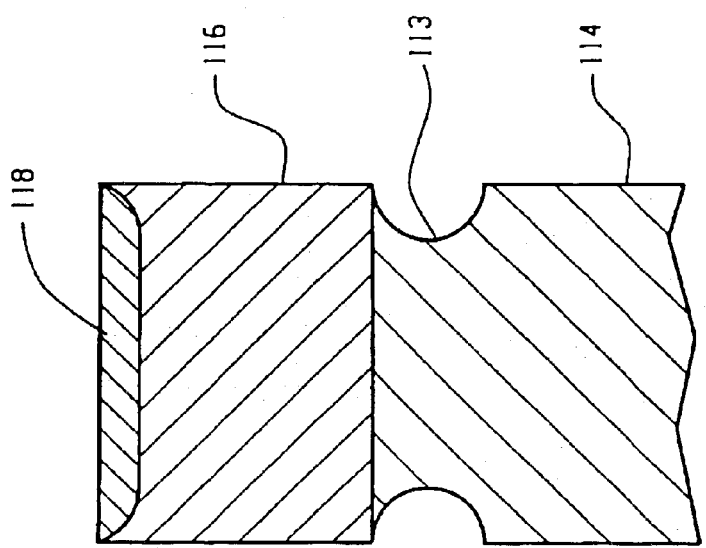
FIG. 4 is a fragmentary sectional view depicting a tip portion of another embodiment according to the present invention.

The distal end of the stem portion 114 is attached to transition piece 116. In FIG. 3, the hardened steel valve tip material is a layer of a hardened conventional material 118 that is attached to the transition piece 116 in any of several ways which include but are not limited to weld cladding, coating, laser cladding powder material, or even a thermally sprayed deposit of a material like Eatonite 6 or Stellite 6. Eatonite is a federally registered trademark of Eaton Corporation. Stellite 6 is a federally registered trademark of Deloro Stellite Company. The deposited layer 118 has a preferred thickness of approximately 0.5 mm or less. The transition piece 116 is attached to the TiAl stem 114 immediately above the keeper groove 113 which is cut into the TiAl stem 114. FIG. 4 is a fragmentary enlarged sectional view of an alternate embodiment. In the embodiment shown in FIG. 4, the transition piece 116 includes a recessed area with a puddle of hardened conventional tip material used for the tip portion 118 in a layer with a thickness of approximately 0.5 mm or less. The joint between the transition piece 116 and the TiAl valve stem 114 is located at the top of the keeper groove 113 which has been cut into the TiAl valve stem 114.

Figure 5:
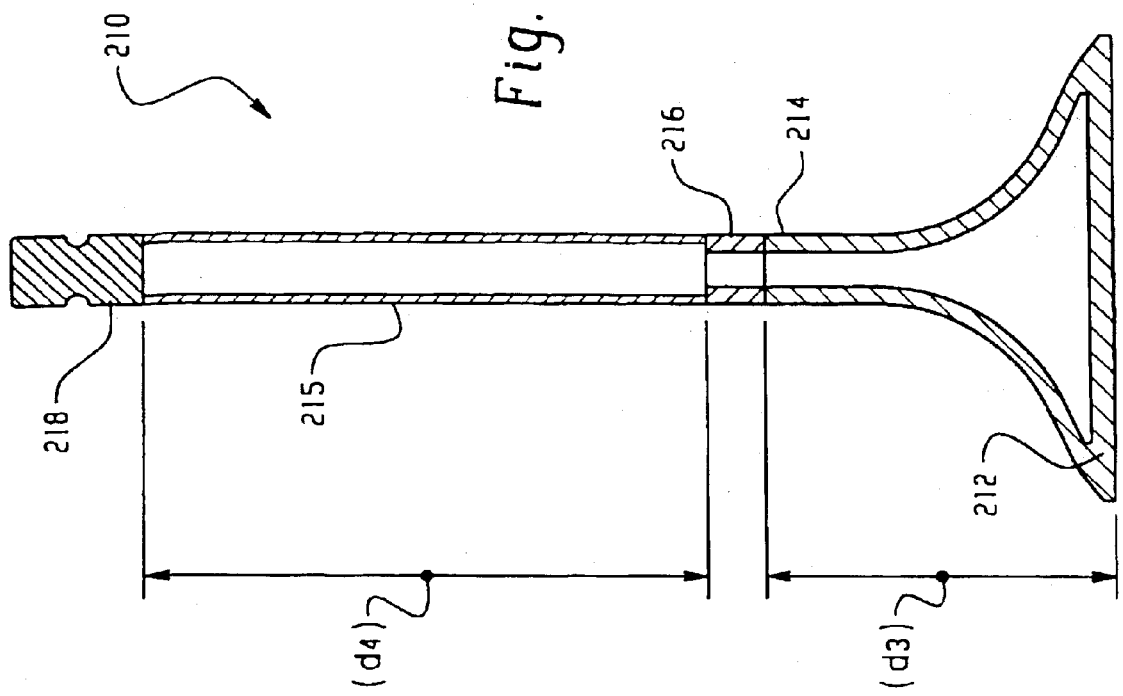
FIG. 5 is still another embodiment of the engine poppet valve according to the present invention.

FIG. 5 depicts still another embodiment of the composite lightweight engine poppet valve 210 in accordance with the present invention. In this embodiment, the valve head portion 212 is depicted as being hollow and is made of a titanium intermetallic material, preferably TiAl. It should be immediately apparent that valve head 212 may be solid as shown in FIGS. 2 and 3. In a like manner, the valve heads 12, 112 depicted as being solid in FIGS. 2 and 3 may be hollow. Valve head 212 includes a part of stem portion 214 made of a titanium intermetallic material formed integrally with valve head 212. Valve head 212 and stem portion 214 extend a selected distance (d3) which is a length that is selected based upon a desired application. Stem portion 214 is attached to one end of a heat treated nickel based alloy transition piece 216 having high creep resistance. A hollow tube 215 having a length (d4) is attached to the other end of transition piece 216. The tube 215 is the remaining portion of the stem portion and has the tip portion 218 attached thereto by conventional means including but not limited to welding, cladding, depositing, or the like. It should be understood that hollow tube 215 may be deep drawn and include a tip portion integrally therewith. The ratio of the length of d3/d4 is at a minimum about a ⅙ relationship of axial length, for example, d3 is twenty (20) mm and d4 is one hundred seventeen (117) mm.

The remaining valve stem portion 215 may be made from a wide assortment of materials including but not limited to a titanium intermetallic material, a stainless steel material such as a 305 or 304 stainless steel that may be machined, extruded, or deep drawn, a martensitic stainless steel material, or a nickel base alloy.

The transition piece 16, 116, 216 is a heat treated nickel base alloy with high creep resistance that is preferably solution treated, double aged, or even triple aged to maximize the material's creep resistance and deformation resistance to the TiAl material. The creep resistance of the transition piece 16, 116, 216 is at least 500 mega Pascals (mPa) at a temperature of approximately 650 degrees C. after about 1000 hours. An exemplary heat treatment process includes but is not limited to the following: a solution treating temperature of about 1093 degrees C. to about 1150 degrees C. for a minimum of about twenty minutes, followed by air cooling to about room temperature; a first age hardening temperature of about 815 degrees C. to about 870 degrees C. for a minimum of about two hours, followed by air cooling to room temperature; a second age hardening temperature of about 704 degrees C. to about 760 degrees C. for a minimum of about two hours, followed by air cooling to room temperature; and a third age hardening temperature of about 650 degrees C. to about 704 degrees C. for a minimum of about two hours, followed by air cooling to room temperature. It should be understood that cooling may occur with water or oil quenching instead of air cooling.

Suitable transition piece materials include but are not limited to Inconel 751, Waspaloy, and Udimet 720. Inconel is a federally registered trademark of Inco Alloys International, Inc. Udimet is a federally registered trademark of Special Metals Corporation. Waspaloy is a trademark of United Technologies Corp. It should be immediately apparent that other materials having a similar creep and deformation resistance to TiAl may be used with the present invention as a transition piece.

TiAl or other titanium intermetallics may not exhibit sufficient wear resistance when they are in continual contact against hardened materials like carburized steels. To improve wear resistance at the valve stem, the valve stem portion 14, 114, 214, 215 may be coated along its length with a coating that includes, but is not limited to, an ion nitride coating, a plasma carburized coating, thermal sprayed coatings, a chromium plated coating, a molybdenum sprayed coating, an Eatonite coating, physical vapor deposition (PVD) or chemical vapor deposition (CVD) type coatings or a nitride coating.

The tip portion 18, 118, 218 preferably is a solid, hardened material such as SAE 1547 or 8645 or Silchrome-1 Steel (Society of Automotive Engineers (SAE) J775 standard) material which is commercially available from commercial suppliers like Charter Steel or Crucible Steel for example. Alternatively, the tip portion 18, 118, 218 may be simply a conventional hardened steel material known in this art.

In the above manner, the present invention provides a composite lightweight valve made with components that can be assembled rapidly. This makes the composite lightweight valve according to the present invention more economical to manufacture. The use of the titanium aluminide material yields excellent sulfidation resistance, good hot hardness, sufficient oxidation resistance, optimum mechanical strength, and high thermal conductivity along with lower thermal expansion.

Another aspect of the present invention is directed to a method for making the composite lightweight engine valve. A significant aspect of the method according to the present invention is that the transition piece is attached first to the conventional material, and then to the TiAl valve stem with a solid state attachment. It should be apparent that this sequence may be reversed. The valve head portion 12, 112, 212 and stem portion 14, 114, 214 are formed preferably of titanium aluminide (TiAl) with a casting process. As mentioned earlier, the TiAl castings are subjected to hot isostatic pressing (HIP) a process known to those of ordinary skill in this art that is used to remove centerline shrinkage and to close internal porosity.

Referring primarily back to FIG. 2, a conventional valve tip material, like SAE 8645, with an axial length of about 50 mm or about two inches is preferably friction welded to a solution and heat treated Inconel 751 material with an axial length of about 50 mm or about two inches, or whatever length is required to enable the conventional tip material to be friction welded thereto. The Inconel 751 material is the transition piece 16, 116, 216 which is machined to an axial length of about 4 mm–5 mm or about 0.180 inches. The term "machined" as used is intended to include but not be limited to cutting-off, taking down, turning or grinding the material. The transition piece is then preferably friction welded to the TiAl stem portion 14, 114, 214.

The welding process is preferably a friction welding process with parameters as set forth below in Table 1.

| Parameters | Friction Pressure | | Forging Pressure | Friction Time | | Forging Time | Rotational |
| --- | --- | --- | --- | --- | --- | --- | --- |
| | P0 (kg/mm$^2$) | P1 (kg/mm$^2$) | P2 (kg/mm$^2$) | T0 (sec) | T1 (sec) | T2 (sec) | Speed (rpm) |
| Low | <10 | 10 | 41 | 5 | 14 | 7 | 2000 |
| Nominal | <10 | 13 | 41 | 5 | 18 | 7 | 2000 |
| High | <10 | 16 | 62 | 5 | 22 | 7 | 2000 |

It should be understood that other welding or brazing techniques and/or parameters may be employed and include but are not limited to brazing, inertia welding, direct drive welding, friction stir welding, resistance welding, magnetic pulse welding, or capacitor discharge welding.

While specific embodiments of the invention have been shown and described in detail to illustrate the application of the principles of the invention, it will be understood that the invention may be embodied otherwise without departing from such principles.

We claim:

1. A composite lightweight engine poppet valve comprising a valve head portion, a stem portion, a tip portion, and a flared fillet portion of said valve head portion defining a region between said valve head portion and said stem portion, said valve head portion and at least a portion of said stem portion being made of a titanium intermetallic material, said stem portion having a first selected length (d1, d2), said first selected length (d1, d2) of said stem portion being attached with a solid state attachment to one end of a heat treated nickel base alloy transition piece having high creep resistance, said heat treated nickel base alloy transition piece having high creep resistance comprising a heat treated nickel base alloy material having a creep resistance of at least approximately 500 mPa at about 650 degrees C. after about 1000 hours, said transition piece further being attached at another end to a tip portion made from a different material.

2. A composite lightweight engine poppet valve as recited in claim 1, wherein said titanium intermetallic material comprises a member selected from the group consisting of a titanium alloy, titanium aluminide, and titanium.

3. A composite lightweight engine poppet valve as recited in claim 1, wherein said heat treated nickel base alloy material comprises a member selected from the group consisting of an Inconel 751, Waspaloy, and Udimet 720.

4. A composite lightweight engine poppet valve as recited in claim 1, wherein said heat treated nickel base alloy material comprises a solution treated double aged hardened material.

5. A composite lightweight engine poppet valve as recited in claim 1, wherein said heat treated nickel base alloy material comprises a solution treated triple aged hardened material.

6. A composite lightweight engine poppet valve as recited in claim 1, wherein said titanium intermetallic stem portion is friction welded to said heat treated nickel base alloy transition piece.

7. A composite lightweight engine poppet valve as recited in claim 1, wherein said stem portion comprises a coating being a member selected from the group consisting of a chromium plated coating, a molybdenum sprayed coating, an Eatonite coating, a PVD type coating, a CVD type coating, a thermally sprayed coating, and a nitrided coating.

8. A composite lightweight engine poppet valve comprising a valve head portion, a first and a second stem portion, a tip portion, and a flared fillet portion of said valve head portion defining a region between said valve head portion and said first stem portion, said valve head portion and said first stem portion being made of a titanium intermetallic material, said first stem portion being attached with a solid state attachment to a first end of a heat treated nickel base alloy transition piece having a high creep resistance, said heat treated nickel base alloy transition piece comprising a creep resistance of at least approximately 500 mPa at about 650 degrees C. after about 1,000 hours, said second stem portion being a hollow tube with one end of said tube being attached to a second end of said transition piece, and the other end of said second stem portion being attached to said tip portion.

9. A composite lightweight engine poppet valve as recited in claim 8, wherein said titanium intermetallic material comprises a member selected from the group consisting of a titanium alloy, titanium aluminide and titanium.

10. A composite lightweight engine poppet valve as recited in claim 8, wherein said second stem portion comprises a material being a member selected from the group consisting of a stainless steel material, an aluminum material, a machined or deep drawn 304 or 305 stainless steel material, a titanium aluminide material, a titanium alloy, a machined, extruded, or deep drawn martensitic stainless steel material, and a nickel base alloy.

11. A composite lightweight engine poppet valve as recited in claim 10, wherein said second stem portion further comprises a coating being a member selected from the group consisting of a chromium plated coating, a molybdenum sprayed coating, an Eatonite coating, a PVD type coating, CVD type coating, a thermally sprayed coating, and a nitrided coating.

12. A composite lightweight engine poppet valve as recited in claim 8, wherein said first and second stem portions further comprise a coating being a member selected from the group consisting of a chromium plated coating, a molybdenum sprayed coating, an Eatonite coating, a PVD type coating, CVD type coating, a thermally sprayed coating, and a nitrided coating.

13. A composite lightweight engine poppet valve as recited in claim 8, wherein said heat treated nickel base alloy is a member selected from the group consisting of a Inconel 751, Waspaloy, Udimet 720, a solution treated double aged hardened material, and a solution treated triple aged hardened material.

14. A method for making a composite lightweight engine poppet valve, comprising the steps of:
   forming a valve head and at least a portion of the stem portion from a titanium intermetallic material;
   attaching a heat treated nickel base alloy transition piece with a high creep resistance to a material having wear resistance for forming a tip portion, the heat treated nickel base alloy transition piece having a creep resistance of at least approximately 500 mPa at about 650 degrees C. after about 1,000 hours;
   machining the heat treated nickel base alloy transition piece to a selected length; and
   attaching with a solid state attachment the titanium intermetallic stem portion of the valve head to the heat treated nickel base alloy transition piece.

15. A method according to claim 14, wherein the attaching steps comprises the steps of friction welding.

16. A method according to claim 14, wherein the step of attaching the heat treated nickel base alloy transition piece comprises the step of:
   solution treating the heat treated nickel base alloy and at least double age hardening the heat treated nickel base alloy prior to attaching the heat treated nickel base alloy transition piece to the wear resistant material.

17. A method according to claim 16, further comprising the step of coating the stem portion with a material being a member selected from the group consisting of a chromium plated coating, a molybdenum sprayed coating, an Eatonite coating, a nitride coating, a thermally sprayed coating, a PVD type coating, and a CVD type coating.

18. A method according to claim 14, wherein the step of forming the valve head and at least a portion of the stem portion from a titanium intermetallic material, further comprises the steps of:
   forming the valve head with a first stem portion made from a titanium intermetallic material;
   providing a second tubular stem portion, the second tubular stem portion being made of a material different from the first stem portion;
   attaching one end of the second stem portion to one end of the heat treated nickel base alloy transition piece;
   making a solid state attachment of the first stem portion to the other end of the heat treated nickel base alloy transition piece; and
   attaching the tip portion to the other end of the second stem portion.

* * * * *